United States Patent [19]
Ellsworth et al.

[11] 3,983,016
[45] Sept. 28, 1976

[54] METHOD OF PREPARING CHROMIUM

[75] Inventors: Arthur C. Ellsworth, Corpus Christi; William W. Carlin, Portland, both of Tex.

[73] Assignee: PPG Industries, Inc., Pittsburgh, Pa.

[22] Filed: Oct. 1, 1975

[21] Appl. No.: 618,585

Related U.S. Application Data

[63] Continuation of Ser. No. 490,152, July 19, 1974, abandoned.

[52] U.S. Cl. ................................. 204/89; 204/97; 204/105 R
[51] Int. Cl.² .................. C25C 1/10; C25B 1/14; C25B 1/22
[58] Field of Search .................... 204/105 R, 89, 97

[56] References Cited
UNITED STATES PATENTS

| | | |
|---|---|---|
| 3,305,403 | 2/1967 | Carlin .................................. 204/89 |
| 3,423,300 | 1/1969 | Joo et al. ............................. 204/99 |
| 3,481,851 | 12/1969 | Lancy ................................. 204/97 |

*Primary Examiner*—R. L. Andrews
*Attorney, Agent, or Firm*—Richard M. Goldman

[57] ABSTRACT

Disclosed is a method of operating a chromium metal electrolytic cell in series with a chromic acid cell. The feed to the chromium metal cell is the chromic acid-alkali metal dichromate effluent from the chromic acid cell and the product of the chromium metal cell is chromium metal and depleted chromic acid-alkali metal dichromate solution. The depleted chromic acid-alkali metal dichromate solution is recycled to the chromic acid cell with make up alkali metal chromate and alkali metal dichromate.

20 Claims, 4 Drawing Figures

ISO-Efficiency for Chromium Recovery as a Function of Chromic Acid/Sodium Dichromate Ratio and Total Solids Content Currency Efficiency for Chromium Recovery VS $SO_4^=$ Concentration

METHOD OF PREPARING CHROMIUM

This is a continuation of application Ser. No. 490,152, filed July 19, 1974, now abandoned.

BACKGROUND

Chromium has been prepared by the electrolysis of chromium (+6) in chromic acid solutions and more recently by the electrolysis of chrome-alum mixtures containing chromium (+2) and chromium (+3) prepared by leaching of ferro-chrome with sulfuric acid. The chrome-alum process involves solution of high carbon ferro-chrome in sulfuric acid, crystallization of the ferrous sulfate out of the soultion, and the addition of ammonium sulfate to the chrome-alum followed by subsequent crystallization of the chrome-alum. The chrome-alum is then electrolyzed to yield chromium metal. The chrome-alum process is characterized by the presence of sulfate by-products which must be disposed of.

SUMMARY

It hs now been found that a two electrolysis, series process may be used to provide electrolytic chromium with a minimum of by-product and waste product disposal problems. According to the disclosed process, an aqueous electrolyte containing an alkali metal chromate and chromic acid is electrolyzed in a chromium metal electrolytic cell. Chromium metal is formed at the cathode of the chromium metal cell and an effluent stream depleted in chromic acid content is recovered from the chromium metal cell. The effluent stream is introduced into the anolyte chamber of a chromic acid diaphragm cell, along with a make up solution containing an alkali metal chromate and an alkali metal dichromate. An electrolyzing current is passed through the chromic acid diaphragm cell and the product of the cell, alkali metal chromate and chromic acid, is withdrawn from the cell and introduced into the chromium metal cell.

As used herein, the term "alkali metal chromate" refers to a compound having the formula $M_2CrO_4$ where M is an alkali metal chosen from the group consisting of potassium and sodium, and where the alkali metal chromate has the formula $Na_2CrO_4$ or $K_2CrO_4$.

As used herein, the term "alkali metal dichromate" is a dichromate of an alkali metal, having the formula $M_2Cr_2O_7$ where M is an alkali metal chosen from the group consisting of sodium and potassium, and the alkali metal dichromate has the formula $Na_2Cr_2O_7$ or $K_2Cr_2O_7$.

As used herein, the term "alkali metal hydroxide" includes those materials having the formula MOH where M is chosen from the group consisting of sodium and potassium and where the hydroxide has the formula KOH or NaOH.

As used herein the term "alkali metal chloride" includes those materials having the formula MCl where M is chosen from the group consisting of sodium and potassium.

As used herein, the term "chromic acid"is a compound of hexavalent chromium having the formula $CrO_3$ and the equivalent formula $H_2CrO_4$.

As used herein, the term "total solids content" refers to the total alkali metal chromate, alkali metal dichromate, and chromic acid present in an aqueous liquid composition.

DETAILED DESCRIPTION

The method of this invention may be understood by reference to the appended figures.

Figure 1:
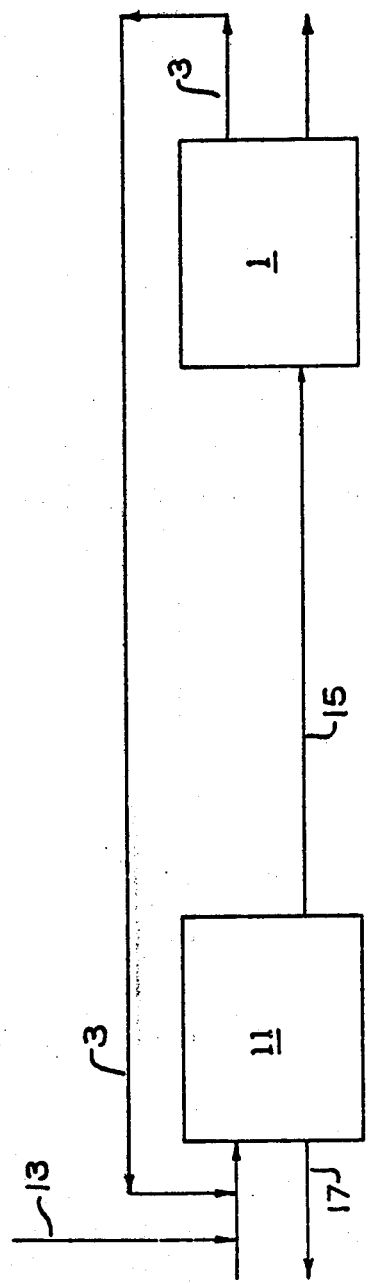
FIG. 1 is a simplified flow diagram of the process of this invention.

As shown in FIG. 1, chromic acid and alkali metal dichromate are electrolyzed in the chromium metal electrolytic cell 1. Chromium metal is formed at the cathode of the chromium metal electrolytic cell 1 and an effluent stream 3 is removed from the chromium metal cell 1. The effluent stream 3 is recycled from the chromium metal cell 1 to the chromic acid cell 11 where the effluent 3 and a make up feed of alkali metal chromate and alkali metal dichromate 13 are fed to the chromic acid cell 11. The recycle stream 3 and make up stream 13 are electrolyzed in the anolyte chamber of the chromic acid cell 11. A product stream 15 containing alkali metal dichromate and chromic acid is recovered from the anolyte chamber of the chromic acid cell 11 and this anolyte liquor is fed to the chromium metal cell 1. Alkali metal hydroxide catholyte liquor is recovered from the catholyte chamber of the chromic acid cell 11.

This process involves the operation of two electrolytic cells 1 and 11 in series. The series cell system includes a chromic acid cell 11 and a chromium metal cell 1. The feed to the complete system is an aqueous liquid composition containing an alkali metal chromate and an alkali metal dichromate. The alkali metal chromate and alkali metal dichromate feed is introduced into the anolyte chamber of the chromic acid cell 11. The products of the cell series system include alkali metal hydroxide, hydrogen, oxygen, and chromium metal. The alkali metal hydroxide stream 17 is recovered from the catholyte chamber of the chromic acid cell 11 while the chromium metal is recovered from the chromium metal electrolytic cell 1.

The product of the chromic acid cell 11, i.e., a liquid composition containing chromic acid and alkali metal dichromate, is the feed to the chromium metal cell. The recycle 3 of the chromium metal cell 1 to the chromic acid cell 11 is an alkali metal dichromate solution, depleted in chromic acid content with respect to the feed stream 15 to the chromium metal cell 1.

The chromium metal product of the two cell, series system is high purity chromium metal generally containing less than about 0.02 weight percent metallic impurities such as iron or aluminum.

The feed 13 to the chromic acid cell 11 is alkali metal chromate and alkali metal dichromate. When a concentrated chromic acid effluent is desired, e.g., for crystallization of some of the chromic acid, and dilution with water of the feed to the chromium metal cell, the alkali metal chromate content of the feed stream is from about 2 to about 5 weight percent of the feed stream and most frequently from about 3 to about 4 weight percent of the feed stream and the alkali metal dichromate content of the feed stream is in excess of 50 weight percent of the feed stream, for example from about 55 percent to about 65 percent of the feed stream. In this way, the feed stream contains less than 67 weight percent dissolved solids, i.e., the feed stream contains from about 700 to about 900 grams per liter of dissolved solids. If, however, the product of the chromic acid cell is to be fed directly to the chromium metal cell without addition of water or without recovery of any side streams, the feed stream should contain less than about 35 percent and preferably less than about 30 percent total solids.

Regardless of the solids content of the cell product, however, the ratio of alkali metal oxide to chromic acid in the feed to the chromic acid cell, i.e., the ratio $M_2O/CrO_3$, mole basis, where $M_2O$ is as described hereinabove, is from about 1 to about 0.2.

Electrolysis in the chromic acid cell is conducted at a current density of from about 100 to about 600 amperes per square foot and preferably at a current density of from about 100 to about 300 amperes per square foot. The cell voltage depends on the current density and on the electrical properties of the membrane or diaphragm as will be more fully described hereinafter. However, normally, the cell voltage is from about 4.0 to about 6.5 volts and most frequently from about 4.5 to about 4.7 volts. The electrolyte temperature is generally from about 20°C up to the boiling point of the electrolyte and preferably from about 60°C to about 80°C, within which temperature range current efficiency appears to be most advantageous.

The product of the chromic acid cell may either be fed substantially entirely to the chromium metal cell without addition of water, or, in an alternative exemplification of this invention, some of the catholyte liquor may be diverted and the chromic acid crystallized therefrom, for example from a side stream, and the balance of the chromic acid cell effluent may be diluted with water and fed to the chromium metal cell.

In the exemplification of this invention wherein substantially all of the chromic acid cell anolyte effluent is fed to the chromium metal cell, the total solid content of the chromic acid cell anolyte liquor is from about 10 to about 30 weight percent and preferably from about 15 to about 25 weight percent. The mole ratio of chromic acid to alkali metal dichromate, i.e., $CrO_3/M_2Cr_2O_7$ is from about 1:1 to about 2:1 and preferably about 1.5:1 to about 1.7:1.

Alternatively, when a portion of the chromic acid cell effluent is recovered as chromic acid and crystallized, the total solids content is from about 50 weight percent to about 70 weight percent and the mole ratio of chromic acid to alkali metal dichromate, i.e., $CrO_3/M_2Cr_2O_7$ is from about 1:1 to about 4:1 and preferably from about 2:1 to about 3:1. According to this exemplification, some of the chromic cell anolyte liquor is fed to a crystallizer, and the balance of the anolyte liquor is diluted, e.g., with water, and fed to the chromium metal cell.

Other products of the chromic acid cell include a catholyte liquor of alkali metal hydroxide, anodically evolved oxygen, and cathodically evolved hydrogen.

The chromic acid cell itself includes a single electrolyte chamber divided into an anolyte chamber and a catholyte chamber by a permeable barrier. The permeable barrier may be a diaphragm, for example, an asbestos diaphragm. Alternatively, the permeable barrier may be an electrolyte impermeable but cation permeable barrier such as a DuPont NAFION membrane or a maleic anhydride-styrene-divinylbenzene membrane. Chromic acid cells useful in the practice of this invention are described, for example, in U.S. Pat. No. 3,305,463 to W. W. Carlin for *Electrolytic Production of Dichromates*.

In the type of cell described therein, he anode and cathode are separated by a permionic barrier, forming an anolyte chamber and a catholyte chamber. The permionic membrane may either be an actual membrane or a coated diaphragm. Suitable membranes and coated diaphragms include synthetic polymeric materials, natural materials, and synthetic inorganic materials, all of which are capable of transmitting or permitting the passage of alkali metal ion but which are substantially impermeable to chromate ion. Additionally, the permionic membranes useful in chromic acid cells prevent the passage of anolyte liquor into the catholyte chamber of the electrolytic cell.

Typical barriers, which may be either membranes or solid materials over which a permionic material is coated, include organic plastic materials coated on substrates, and self-supporting films, for example of organic materials. Examples of materials which are permeable to sodium ions but impermeable to chromate ions in chromic acid solution include cross-linked organic polymers containing carboxylic acid and carboxylic acid-forming radicals. Additionally, other acid radicals may be substituted for the carboxylic acid radicals on the cross-linked organic polymers. Such radicals include sulfonyl radicals, sulfate radicals, phosphoro radicals, phosphonyl radicals, and nitrosol radicals.

The polymeric materials containing such radicals include sulfonated styrene divinylbenzene copolymers, maleic anhydride divinylbenzene styrene terpolymers, sulfonated phenolformaldehyde polymers, and sulfonated carboxylated cross-linked epoxy resins of the epichlorohydrate type.

The barrier may be prepared by the in-situ curing or polymerization or an organic polymer on a suitable diaphragm material such as asbestos. For example, maleic anhydride-styrene may be cross-linked with divinylbenzene in the presence of a suitable catalyst, such as benzoylperoxide, dicumyl peroxide, or hydrogen peroxide, in-situ on an asbestos substrate. Alternatively, the in-situ polymerization may be catalyzed by a reduction-oxidation catalyst system or an organo-sulfonyl catalyst system or a persulfate catalyst.

The chromic acid cell includes an anode which may be a lead coated steel anode or a lead anode or a lead-antimony anode or a lead-bismuth anode or a lead-tin anode or a lead-silver anode. The anode is separated from the cathode by the aforementioned permionic barrier positioned between the anode and the cathode. The membrane is preferably in contact with the cathode and spaced from the anode.

A spacer separates the anode from the membrane. On the opposite side of the spacer from the anode is the membrane in contact with the cathode. In this way, the membrane establishes an anode compartment and a cathode compartment so that the anolyte liquor and the catholyte liquor may flow separately from each other in each of the respective chambers.

The spacer includes an outlet pipe for removal of anolyte liquor nd an anolyte overflow pipe to maintain the proper anolyte liquor level in the cell. The cathode compartment includes a catholyte liquor removal pipe, a water inlet pipe, and a hydrogen outlet pipe. Thus, sodium chromate solution and the recycle stream may be fed into the anolyte chamber of the cell and an alkali metal dichromate-chromic acid solution recovered from the anolyte chamber of the cell as described more fully hereinbefore. The chromium metal recovery process may either be carried out in a single chamber electrolytic cell or multi-chamber electrolytic cell. When carried out in a single chamber electrolytic cell, the electrolyte contains chromic acid and an alkali metal dichromate such as sodium dichromate. The electrolyte contains from about 10 to about 30 weight percent total solids, preferably from about 15 to about 25 weight percent total solids and most preferably from bout 17 to about 22 weight percent total solids. The mole ratio of chromic acid to alkali metal dichromate, i.e., the ratio $CrO_3/M_2Cr_2O_7$ is in excess of 0.5:1, generally from about 0.8:1 to about 2.0:1 and preferably from bout 1.0:1 to about 1.5:1. Higher or lower mole ratios, e.g., below about 0.5:1 or above about 2.0:1 may be used, although this may materially reduce the current efficiency. However, such high mole ratios, e.g., 6:1 or even 8:1, may be necessitated by high ratios in the chromic cell effluent.

Additionally, the electrolyte may contain sulfte ion which may be in the form of sodium sulfate or sulfuric acid. The sulfate ion is from about 0.1 to about 0.3 weight percent of the solution and preferably from about 0.16 to about 0.17 percent of the solution. Alternatively, the sulfate ion content may be expressed in terms of the chromic acid content in which case the sulfate ion content is from about 0.4 weight percent of the chromic acid to about 1.5 weight percent of the chromic acid, preferably from about 1.2 to about 1.3 weight percent of the chromic acid.

The temperature of the chromium metal electrolytic cell is maintained as low as possible, for example below about 27°C, preferably below about 20°C and even, where possible, below about 10°C. This is because the efficiency of the chromium metal recovery process, i.e., the chromium recovered at the cathode per kilowatt hour, is highly sensitive to electrolyte temperature. During electrolysis the current density is maintained at from about 250 amperes per squre foot to about 700 or more amperes per square foot by maintaining a cell voltage of from bout 4.0 volts to about 6.0 volts.

The chromium metal cell product is electrolytic chromium metal at the cathode and recycle liquor containing an alkali metal dichromate, as sodium dichromate, and chromic acid for return to the chromic acid cell. The concentration of this recycle liquor correspond to the concentration of the cell liquor within the chromium metal cell.

Within the cell, the electrolysis is carried out between an anode and cathode. The anode may be platinized titanium, or an antimony-lead alloy such as 7 percent antimony, 93 percent lead alloy, or even lead. The cathode may be provided by aluminum, steel, chromium, or the like. Preferably the cathode is aluminum plate.

According to an alternative exemplification of this invention, the chromium metal cell may be a multichamber cell. That is, the chromium metal cell may be divided into an anolyte chamber and a catholyte chamber by a permionic membrane such as a maleic anhydride-styrene-divinylbenzene membrane or a DuPont NAFION membrane as described more fully hereinbefore. Within such a cell, the anolyte is maintained acidic by providing a 10 to 35 weight percent solution of sulfuric acid in the anolyte liquor. The feed to the catholyte chamber of the cell contains chromic acid and an alkali metal chromate, as described hereinabove, containing from about 10 to about 30 weight percent totl solids, preferably from about 15 to about 25 weight percent total solids, and most preferably from about 17 to about 22 weight percent total solids. The mole ratio of chromic acid to alkali metal dichromte, i.e., the ratio $CrO_3/M_2Cr_2O_7$ in molar units, is in excess of 0.5:1 to as high as 6:1 or even 8:1, and preferably from about 0.8:1 to about 2.0:1 and most preferably from bout 1.0:1 to about 1.5:1.

Sulfuric acid is also present in the feed to the catholyte as a catalyst so that the mole ratio of chromic acid to sulfate, i.e., $CrO_3/SO_4^{--}$, is from about 75:1 to about 150:1 and preferably bout 100:1. Alternatively, the catholyte liquor or feed may contain fluorine, for example added as sodium silicon fluoride, $Na_2SiF_6$, so that the ratio of chromic acid to fluoride ion, i.e., the ratio $CrO_3/F^-$ is from about 200:1 to about 300:1 and preferably about 250:1.

According to a still further exemplification of this invention, an alkali metal chloride as sodium chloride or potassium chloride may be added to the feed or to the catholyte liquor so as to provide from about 0.05 to about 0.2 molar, and preferably about 0.1 molar concentration of alkali metal chloride in the catholyte liquor, whereby to provide better deposition of chromium. Most commonly sodium chloride is used. Preferably the catholyte liquor contains from about 300 to about 400 grams per liter of total solids as defined hereinabove and the mole ratio of chromic acid to alkali metal dichromate, i.e., $CrO_3/M_2Cr_2O_7$, is in excess of 1.5:1 and preferably about 2.0:1.

In the operation of the multi-compartment chromium metal cell a side stream or effluent stream 3 of catholyte liquor as described hereinabove is withdrawn from the catholyte chamber of the chromium metal cell 1 and circulated back to the chromic acid cell and an effluent stream 15 anolyte liquor from the chromic acid cell 11 is returned to the chromium metal cell 1. This serves to maintain the level of chromic acid and alkali metal dichromate within the chromium metal cell 1 at the desired levels herein contemplated.

In the preferred mode of operation of the cell series system of this invention, a feed of alkali metal chromate and alkali metal dichromate, such as sodium chromate and sodium dichromate, is fed to the chromic acid cell, along with a recycled stream of alkali metal dichromate, such as odium dichromate from the chromium metal cell. This electrolyte is electrolyzed in the anolyte chamber of the chromic acid cell to provide a chromic acid cell anolyte effluent of alkali metal dichromate and chromic acid, e.g., sodium dichromate and chromic acid. At least a portion of chromic acid cell effluent is the feed to the chromium metal cell. The chromic acid-alkali metal dichromate feed stream, i.e., chromic acid-sodium dichromate feed stream, is introduced into the chromium metal cell where electrolysis is conducted to form chromium metal at the cathode of the chromium metal cell. A recycle stream of alkli metal dichromate, e.g., sodium dichromate, depleted in chromic acid content is recycled to the chromic acid cell.

The present process may be more clearly understood by reference to the following example which are intended as being illustrative only since numerous modifications and variations therein will be apparent to one skilled in the art.

EXAMPLE I

A series of tests were run to determine the effects on chromium metal recovery efficiency of the weight percent dissolved solids in the chromium metal cell electrolyte and the mole ratio of chromic acid to sodium dichromate in the chromium metal cell electrolyte. In each test, a simulated chromic acid cell effluent solution was prepared from reagent grade chromic acid and reagent grade sodium dichromate. Sulfuric acid was then added to the solution to provide a sulfuric acid content of 1.25 weight percent sulfuric acid, basis chromic acid content of the solution. This solution was then fed to a laboratory scale chromium metal recovery cell.

The chromium metal recovery cell was a 1400 milliliter beaker having aluminum cathodes and antimony-lead anodes. The aluminum cathodes were prepared from 0.25 inch thick aluminum plate and had a working area of 1.5 inches wide by 2.5 inches long. The edges of the aluminum plate cathodes were beveled smooth to reduce dendrite formation on the edges.

The anodes were prepared by melting a mixture of 7 weight percent antimony and 93 weight percent lead and casting the molten metal into a heated graphite mold. The anodes were then cut and shaped to match the cathodes.

Each cell consisted of two anodes and one cathode, the cathode being centered 1 inch from each of the two anodes, the two anodes being electrically in parallel with each other and on opposite sides of the cathode. The solution was maintained uniform by stirring with a magnetic stirrer and the temperature was maintained by using a refrigerated water bath.

All experiments were run at 22.5 amperes for 2 hours at a temperature of 20°–25°C thereby providing a current density of 3.0 amperes per square inch. The results shown in Table I, "Variation of Chromium Plating Efficiency and Kilowatt Hours Per Pound of Chromium with Chromic Acid/Sodium Dichromate Ratio and Weight Percent Solids."

The chromium recovery efficiency was based on a theoretical value of 0.323 grams of chromium per ampere hour.

Figure 2:
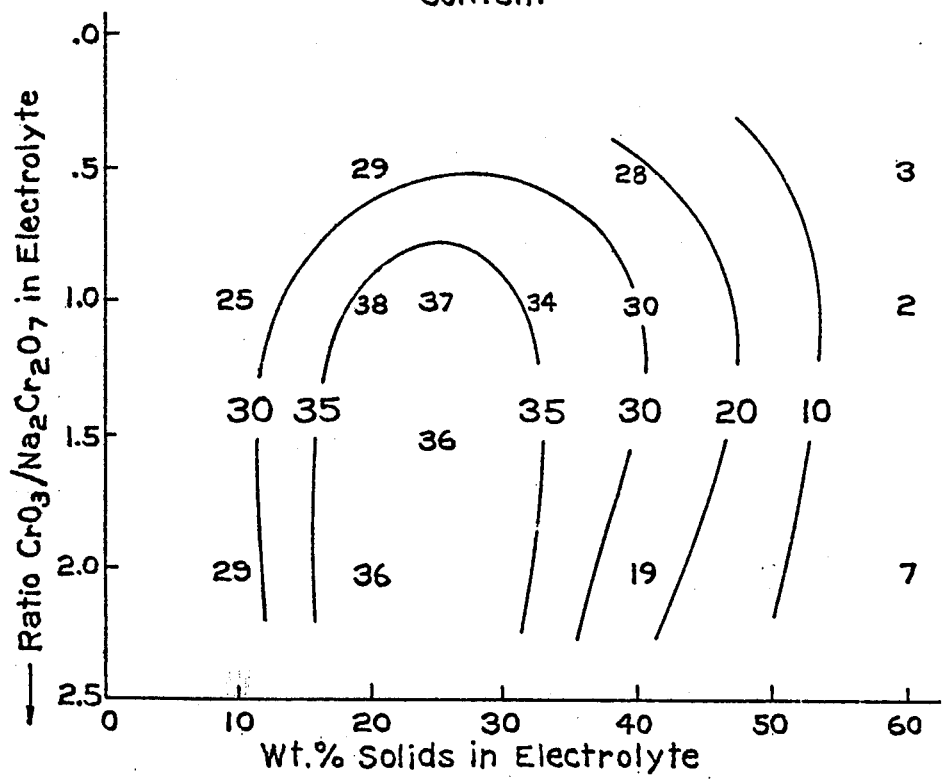
FIG. 2 is a graph correlating chromium recovery current efficiency as a function of the chromic acid/sodium dichromate ratio and the total solids in the electrolyte.

The data in Table I are shown graphically in FIG. 2 which is an iso-plot of current efficiency, i.e., chromium recovery, as a function of ratio of chromic acid to sodium dichromate in the bath and the weight percent solid in the bath.

Table I

Variation of Chromium Plating Efficiency and Kilowatt Hours Per Pound of Chromium With Chromic Acid/Sodium Dichromate Weight Ratio and Percent Solids

| Ratio $CrO_3/Na_2Cr_2O_7$ | Wt. % Dissolved Solids | Cell Voltage Volts | Chromium Plating Efficiency, % | KWH/lb Chromium |
|---|---|---|---|---|
| 0.5 | 60 | 6.89 | 2.8 | 344 |
| 0.5 | 60 | 6.88 | 2.8 | 345 |
| 0.5 | 40 | 5.32 | 28.3 | 26 |
| 0.5 | 40 | 5.33 | 27.4 | 27 |
| 0.5 | 20 | 5.23 | 29.9 | 25 |
| 0.5 | 20 | 5.58 | 28.2 | 28 |
| 1.0 | 60 | 5.90 | 1.7 | 485 |
| 1.0 | 60 | 5.84 | 1.8 | 455 |
| 1.0 | 40 | 4.78 | 30.0 | 22 |
| 1.0 | 40 | 4.60 | 30.0 | 21 |
| 1.0 | 30 | 4.35 | 33.9 | 18 |
| 1.0 | 30 | 4.60 | 33.0 | 19 |
| 1.0 | 25 | 4.73 | 36.8 | 18 |
| 1.0 | 20 | 4.86 | 38.3 | 18 |
| 1.0 | 20 | 4.65 | 38.1 | 17 |
| 1.0 | 10 | 5.88 | 26.4 | 31 |
| 1.0 | 10 | 6.05 | 23.9 | 35 |
| 1.5 | 25 | 4.61 | 35.2 | 18 |
| 1.5 | 25 | 4.61 | 35.7 | 18 |
| 2.0 | 60 | 5.11 | 7.5 | 96 |
| 2.0 | 40 | 4.73 | 19.6 | 34 |
| 2.0 | 40 | 4.62 | 19.4 | 33 |
| 2.0 | 40 | 4.78 | 18.6 | 36 |
| 2.0 | 20 | 4.26 | 35.6 | 17 |
| 2.0 | 20 | 4.52 | 36.5 | 17 |
| 2.0 | 10 | 5.39 | 28.9 | 26 |
| 2.0 | 10 | 5.28 | 28.4 | 26 |

As can be seen from Table I and FIG. 2, maximum chromium recovery efficiency with respect to weight percent dissolved solids in the electrolyte is from about 15 weight percent to about 30 weight percent total solids with an optimum at about 22 to 27 weight percent dissolved solids. As can also be seen from Table I and FIG. 2, chromium recovery efficiency is not as sensitive to the ratio of chromic acid to sodium dichromate as it is to dissolved solid content. However, at ratios of chromic acid to sodium dichromate of less than 1.0 the efficiency shows a decrease while at ratios above about 2.0 the efficiency becomes more sensitive to the ratio of chromic acid to sodium dichromate.

EXAMPLE II

A series of tests were run to determine the effect of sulfuric acid content on chromium recovery efficiency. In each test, an electrolyte was prepared containing 12.5 weight percent chromic acid and 12.5 weight percent sodium dichromate to provide the total dissolved solids content of 25 weight percent. The apparatus used was identical to the apparatus described in Example I. From 0.01 weight percent to 0.25 weight percent sulfuric acid, basis total solution, i.e., from 0.08 weight percent to 2.0 weight percent sulfuric acid, basis chromic acid content, was added to the solution. Electrolysis was conducted at a current density of 3 amperes per square, i.e., 432 amperes per square foot.

Figure 3:
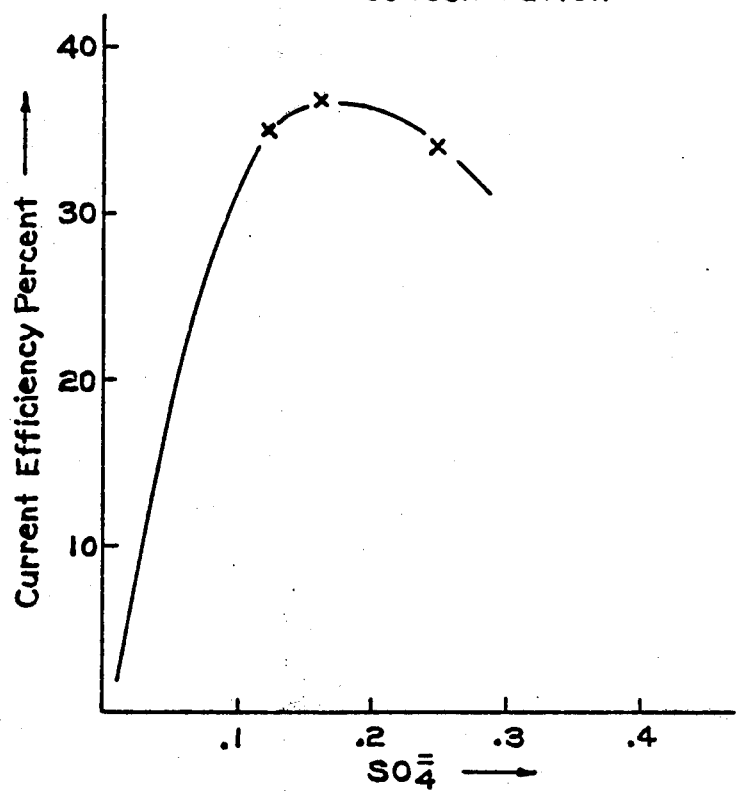
FIG. 3 is a graph correlating chromium recovery current efficiency as a function of ($SO_4^{--}$) ion content.

The results obtained are shown in Table II, "Effect of Sulfate Concentration on Chromium Recovery Efficiency" and in FIG. 3, "Chromium Recovery Efficiency vs. Sulfuric Acid Concentration". As can be seen at constant solids content and constant chromic acid sodium dichromate ratio, the current efficiency rises from effectively 0 at 0 weight percent sulfuric acid solution to a maximum at about a 0.25 weight percent sulfuric acid solution, basis total solution, corresponding to about a 1.6 weight percent sulfuric acid content, basis chromic acid, and then begins dropping off.

Table II

| Wt. % $H_2SO_4$ (Basis total solution) | Temp. °C | Current Density, ASI | Cell Voltage Volts | Efficiency Percent | KWH/Lb Cr |
|---|---|---|---|---|---|
| .25 | 21 | 3.0 | 4.64 | 34.1 | 19.0 |
| .25 | 21 | 3.0 | 4.70 | 31.8 | 20.7 |
| .16 | 22 | 3.0 | 4.82 | 36.8 | 18.4 |
| .12 | 21 | 3.0 | 4.97 | 34.8 | 20.0 |
| .02 | 21 | 3.0 | 4.47 | 0.0 | — |
| .01 | 21 | 3.0 | 4.44 | 0.0 | — |

Effect of Sulfate Concentration on Chromium Recovery Efficiency

EXAMPLE III

Figure 4:
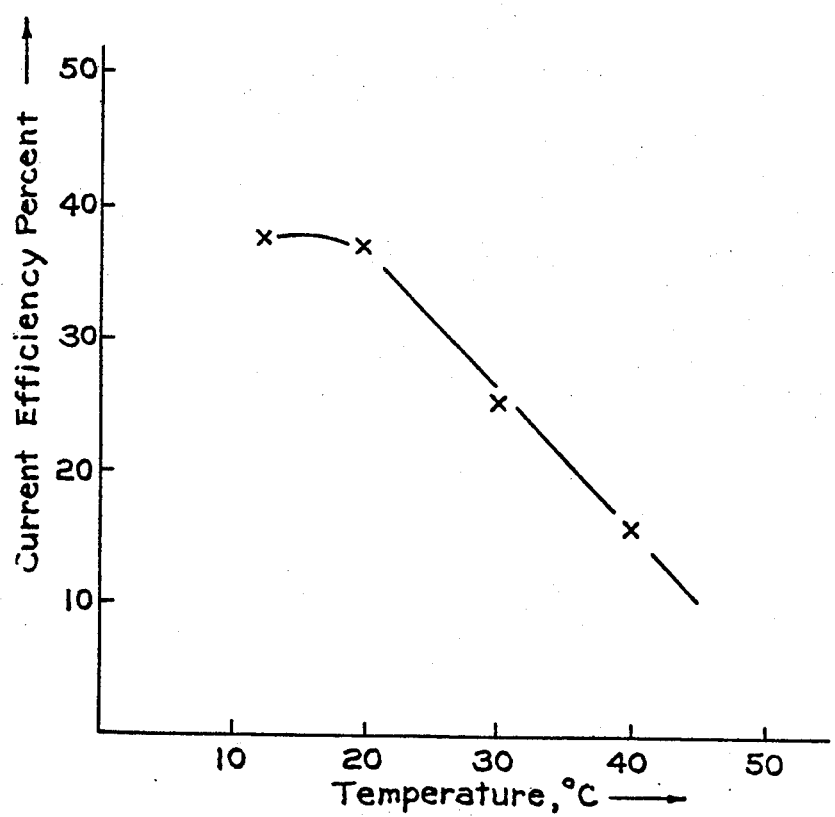
FIG. 4 is a graph correlating chromium recovery current efficiency as a function of electrolyte temperature.

A series of tests were run to determine the effect of electrolyte temperature on chromium recovery efficiency at constant chromic acid/sodium dichromate ratio, constant sulfate ion content, and constant solids concentration. The electrolyte used in each case was a simulated diluted chromic acid cell anolyte effluent liquor prepared from reagent grade chromic acid and sodium dichromate containing 12.5 weight percent sodium dichromate, 12.5 weight percent chromic acid ratio, and 0.16 weight percent sulfuric acid, basis total electrolyte weight (1.28 weight percent sulfuric acid basis chromic acid content). The results are shown in Table III, "Effect of Temperature on Chromium Recovery Efficiency" and FIG. 4, "Current Efficiency for Chromium Recovery vs. Temperature".

Table III

| Wt. % $H_2SO_4$ | Temp., °C | Current Density, ASI | Cell Voltage, Volts | Efficiency, Percent | KWH/Lb Cr |
|---|---|---|---|---|---|
| .16 | 40 | 3.0 | 4.51 | 16.5 | 38.3 |
| .16 | 30 | 3.0 | 4.69 | 25.0 | 26.2 |
| .16 | 22 | 3.0 | 4.82 | 36.8 | 18.4 |
| .16 | 12 | 3.0 | 5.37 | 36.6 | 20.6 |
| .16 | 12 | 3.0 | 5.28 | 37.6 | 19.7 |

Effect of Temperature on Chromium Recovery Efficiency

The tests were conducted at temperatures ranging from 12°C to 40°C with a simulated diluted chromic acid electrolytic cell anolyte liquor effluent. As can be seen from FIG. 4 and from Table III, chromium recovery efficiency and kilowatt hours per pound of chromium are highly sensitive to temperature and begin to decrease sharply at temperatures above about 20°C.

Although the present invention has been described with reference to specific details of certain embodiments thereof, it is not intended that such details be regarded as limitations upon the scope of the invention except and as to the extent that they are included in the claims appended hereto.

We claim:

1. A process for the electrolytic production of chromium metal comprising the steps of:

a. electrolyzing an electrolyte comprising an alkali metal chromate, chromic acid, and from 0.4 to 1.5 weight percent sulfate ion, basis total chromic acid in the feed in a first electrolytic cell;

b. forming chromium metal at a cathode of said first electrolytic cell;

c. removing an effluent steam depleted in chromic acid content from said first electrolytic cell and introducing a portion of said effluent stream into an anolyte chamber of a second electrolytic cell;

d. introducing an aqueous liquid composition containing an alkali metal chromate and an alkali metal dichromate into the anolyte chamber of said second electrolytic cell; and e. passing an electrolyzing current through said second electrolytic cell, removing an effluent comprising an alkali metal chromate and chromic acid from the anolyte chamber of said second electrolytic cell, and introducing the effluent from the anolyte chamber of the second electrolytic cell into the first electrolytic cell.

2. The process of claim 1 wherein a membrane divides the first cell into an anolyte chamber and a catholyte chamber, comprising:

a. providing a catholyte liquor containing the chromic acid, sodium dichromate, and sulfate ion in the catholyte chamber of said first cell and an anolyte liquor containing sulfuric acid in the anolyte chamber of said first cell;

b. removing a catholyte liquor effluent stream from the catholyte chamber of said first cell and introducing a portion of the catholyte liquor effluent stream from the first cell to the anolyte chamber of the second cell; and c. withdrawing an anolyte liquor effluent from the anolyte chamber of said second cell and introducing a portion of the anolyte liquor effluent stream from the second cell to the catholyte chamber of the first cell.

3. The process of claim 2 wherein the catholyte liquor of said first cell contains alkali metal chloride.

4. The process of claim 3 wherein the alkali metal chloride content in the catholyte liquor of said first electrolytic cell is from about 0.05 molar to about 0.20 molar.

5. The process of claim 1 wherein the mole ratio of chromic acid to alkali metal chromate in the electrolyte of said first electrolytic cell is greater than about 0.5:1.

6. The process of claim 5 wherein the mole ratio of chromic acid to alkali metal chromate in the electrolyte of said first electrolytic cell is from about 0.5:1 to about 2.0:1.

7. The process of claim 1 wherein the effluent from said second electrolytic cell is above about 20°C.

8. The process of claim 7 wherein the effluent from said second electrolytic cell is between about 60° and about 80°C.

9. The process of claim 1 wherein the electrolyte in said first electrolytic cell comprises from about 10 to about 30 weight percent total alkali metal dichromate and chromic acid.

10. The process of claim 1 wherein the electrolyte in said first electrolytic cell contains from about 0.4 to about 1.5 weight percent sulfuric acid, basis total chromic acid in the feed.

11. The process of claim 1 wherein the electrolyte in said first electrolytic cell contains from about 0.75 weight percent to 1.5 weight percent alkali metal sulfate, basis chromic acid in the feed.

12. The process of claim 1 wherein the feed temperature to the first electrolytic cell is below about 20°C.

13. The process of claim 1 wherein the effluent from the first electrolytic cell contains less than about 15 weight percent total alkali metal dichromate and chromic acid.

14. The process of claim 1 wherein the effluent temperature from the first electrolytic cell is above about 20°C.

15. The process of claim 1 wherein the feed to the second electrolytic cell contains from about 3 to about 4 weight percent alkali metal chromate and from about 40 to about 60 weight percent alkali metal dichromate.

16. The process of claim 1 wherein the feed to the second electrolytic cell contains from about 700 to about 900 grams per liter of alkali metal chromate and alkali metal dichromate.

17. The process of claim 1 wherein electrolysis is conducted in said second electrolytic cell at a current density of from 100 to 600 amperes per square foot.

18. A process for the electrolytic production of chromium metal comprising the steps of:
  a. electrolyzing a catholyte liquor comprising an alkali metal chromate, chromic acid, and fluoride ion at a chromic acid to fluoride ion ratio of about 200:1 to about 300:1 in a catholyte chamber of a first electrolytic cell;
  b. providing an anolyte liquor containing sulfuric acid in an anolyte chamber of said first electrolytic cell;
  c. forming chromium metal at a cathode of said first electrolytic cell;
  d. removing a catholyte liquor effluent stream depleted in chromic acid content from the catholyte chamber of said first electrolytic cell and introducing a portion of said first electrolytic cell catholyte effluent stream into an anolyte chamber of a second electrolytic cell;
  e. introducing an aqueous liquid composition containing an alkali metal chromate and an alkali metal dichromate into the anolyte chamber of said second electrolytic cell; and
  f. passing an electrolyzing current through said second electrolytic cell, removing an anolyte liquor effluent comprising an alkali metal chromate and chromic acid from the anolyte chamber of said second electrolytic cell, and introducing the second electrolytic cell anolyte liquor effluent into the catholyte chamber of first electrolytic cell.

19. The process of claim 18 wherein the catholyte liquor of said first cell contains alkali metal chloride.

20. The process of claim 19 wherein the alkali metal chloride content in the catholyte liquor of said first electrolytic cell is from about 0.05 molar to about 0.20 molar.

* * * * *

UNITED STATES PATENT AND TRADEMARK OFFICE
CERTIFICATE OF CORRECTION

PATENT NO. : 3,983,016
DATED : September 28, 1976
INVENTOR(S) : Arthur C. Ellsworth and William W. Carlin It is certified that error appears in the above-identified patent and that said Letters Patent are hereby corrected as shown below:

Column 10, line 7, "steam" should be --stream--.

Signed and Sealed this

Fourteenth Day of December 1976

[SEAL]

Attest:

RUTH C. MASON
*Attesting Officer*

C. MARSHALL DANN
*Commissioner of Patents and Trademarks*